(12) United States Patent
Lillibridge et al.

(10) Patent No.: US 11,200,345 B2
(45) Date of Patent: Dec. 14, 2021

(54) FIREWALL TO DETERMINE ACCESS TO A PORTION OF MEMORY

(71) Applicant: Hewlett Packard Enterprise Development LP, Houston, TX (US)

(72) Inventors: Mark Lillibridge, Mountain View, CA (US); Paolo Faraboschi, Sant Cugat (ES); Chris I. Dalton, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 394 days.

(21) Appl. No.: 15/746,494

(22) PCT Filed: Jul. 29, 2015

(86) PCT No.: PCT/US2015/042661
§ 371 (c)(1),
(2) Date: Jan. 22, 2018

(87) PCT Pub. No.: WO2017/019061
PCT Pub. Date: Jul. 29, 2015

(65) Prior Publication Data
US 2018/0204024 A1     Jul. 19, 2018

(51) Int. Cl.
*G06F 21/00* (2013.01)
*G06F 21/70* (2013.01)
*G06F 21/53* (2013.01)
*G06F 3/06* (2006.01)
*G06F 21/74* (2013.01)

(52) U.S. Cl.
CPC ............ *G06F 21/70* (2013.01); *G06F 3/0622* (2013.01); *G06F 3/0659* (2013.01); *G06F 3/0673* (2013.01); *G06F 21/53* (2013.01); *G06F 21/74* (2013.01)

(58) Field of Classification Search
CPC ........ G06F 21/50; G06F 21/53; G06F 3/0622; G06F 21/70; G06F 3/0659; G06F 3/0673; G06F 21/74
See application file for complete search history.

(56) References Cited

U.S. PATENT DOCUMENTS 6,388,989 B1      5/2002   Malhotra
7,853,997 B2 *   12/2010   Conti .................. G06F 12/1458
                                                              726/11

(Continued)

FOREIGN PATENT DOCUMENTS

WO      WO-2007008595         1/2007

OTHER PUBLICATIONS

Office Action, EP Application No. 15899851.8, dated Oct. 15, 2018, pp. 1-11, EPO.

(Continued)

*Primary Examiner* — Andrew J Steinle
(74) *Attorney, Agent, or Firm* — Sheppard Mullin Richter & Hampton LLP (57) ABSTRACT

Techniques for a firewall to determine access to a portion of memory are provided. In one aspect, an access request to access a portion of memory within a pool of shared memory may be received at a firewall. The firewall may determine whether the access request to access the portion of memory is allowed. The access request may be allowed to proceed based on the determination. The operation of the firewall may not utilize address translation.

17 Claims, 7 Drawing Sheets

(56) References Cited

U.S. PATENT DOCUMENTS

| | | | |
|---|---|---|---|
| 7,874,009 B2* | 1/2011 | Kanemura | G06F 12/1458 711/164 |
| 8,307,193 B2* | 11/2012 | Sehr | G06F 12/1491 711/163 |
| 8,613,081 B2* | 12/2013 | Beals | G06F 21/85 726/21 |
| 8,789,170 B2 | 7/2014 | Sastry et al. | |
| 8,893,267 B1* | 11/2014 | Sathe | G06F 21/31 726/21 |
| 8,931,054 B2 | 1/2015 | Huynh et al. | |
| 8,938,782 B2 | 1/2015 | Sawhney et al. | |
| 2008/0091917 A1 | 4/2008 | Dixon et al. | |
| 2008/0222309 A1 | 9/2008 | Shanbhogue | |
| 2010/0191913 A1* | 7/2010 | Chlipala | G06F 12/0866 711/122 |
| 2010/0319065 A1* | 12/2010 | Hansson | H04W 12/0808 726/14 |
| 2012/0072734 A1* | 3/2012 | Wishman | G06F 21/572 713/189 |
| 2012/0246404 A1 | 9/2012 | Malzahn et al. | |
| 2013/0305340 A1* | 11/2013 | Wotring | H04L 63/1416 726/11 |
| 2014/0137180 A1* | 5/2014 | Lukacs | G06F 21/53 726/1 |
| 2014/0156878 A1 | 6/2014 | Hameed et al. | |
| 2014/0283115 A1 | 9/2014 | Ben-Natan et al. | |
| 2014/0330869 A1 | 11/2014 | Factor et al. | |
| 2014/0331337 A1 | 11/2014 | Factor et al. | |
| 2014/0359788 A1* | 12/2014 | Laine | G06F 21/14 726/27 |
| 2015/0052325 A1* | 2/2015 | Persson | G06F 12/1458 711/163 |
| 2015/0199507 A1* | 7/2015 | Azab | G06F 21/53 726/22 |
| 2015/0347741 A1* | 12/2015 | Krstic | G06F 21/32 726/19 |
| 2016/0283402 A1* | 9/2016 | Schulz | G06F 21/00 |

OTHER PUBLICATIONS

International Searching Authority, The International Search Report and the Written Opinion, dated May 13, 2016, 12 Pages.

Popa et al ~ "CloudPolice: Taking Access Control out of the Network" ~ Hotnets '10 ~ 2010 ~ 6 pages.

\* cited by examiner

FIREWALL TO DETERMINE ACCESS TO A PORTION OF MEMORY

BACKGROUND

Computing systems may include processors and memory. The memory may store instructions executable by the processor as well as data that may be operated on by the processor. The memory may be connected directly to the processor, connected through another processor, or connected through a memory fabric. Depending on the particular processor architecture, the processor may access memory in byte-size units or in larger units, such as a cacheline-sized units.

BRIEF DESCRIPTION OF THE DRAWINGS

FIGS. 2(a,b) depict other example implementations of systems that may utilize the firewall techniques described herein.

DETAILED DESCRIPTION

There are many different architectures available for computing systems. In one such architecture, a plurality of processors may be connected to a pool of shared memory via a fabric, or some other type of interconnect. In such an architecture, each processor may be able to physically access any part of the memory. In some cases, the entire computing system may be under the control of a single operating system (OS) instance. As such, the single OS instance may be responsible for ensuring that all processors access the shared memory in such a way as to not interfere with one another.

Another possible architecture also includes multiple processors connected to a pool of shared memory. For example, the processors could be standalone central processing units (CPUs) or could be integrated within a larger integrated circuit, such as a system on a chip (SOC). For purposes of this description, processor and SOC may be used interchangeably. Each of the SOCs may again be able to physically access every part of the shared memory through some type of memory interconnect, such as a memory fabric. However, unlike the previously described system, each SOC (or in some cases, groups of SOCs) may be under the control of its own OS instance. In other words, the pool of shared memory may be accessed by SOCs that may not necessarily be under the control of the same OS instance.

Because each SOC may access all of the shared pool of memory and there is no common OS instance to coordinate such access, conflicts may arise. For example, more than one SOC may attempt to utilize the same portion of the shared memory without coordination with other SOCs using that portion of memory. As should be clear, modifications made to the memory by one SOC may be viewed as data corruption by another SOC.

In a multitenant environment, different SOC's may be running code from different tenants and thus it may be necessary to prohibit them from accessing each other's' data.

The techniques described herein overcome these problems and others by providing at least one firewall between the SOCs and the pool of shared memory. The firewalls may include configuration data that may be used to determine if a given SOC is allowed to access a given portion of memory, and if so, what type of access is allowed (e.g., read only, read/write, etc.). A firewall may then regulate the level of access to the portion of shared memory based on the determination.

In addition, techniques are provided to allow for firewall configuration data to be altered. A security agent may determine which portions of the shared memory can be accessed by each of the SOCs. This data may then be sent to the firewall(s) in a secure manner, such that any alteration of the firewall configuration data can be ensured to have originated with the security agent. Thus, even if a rogue OS or process running on a SOC were to attempt to bypass the firewall controls on access to the shared memory by altering the firewall configuration data, such attempt would be unsuccessful as the request did not originate from the security agent. The techniques described above can be further understood in conjunction with the appended drawings and the description below.

Figure 1:
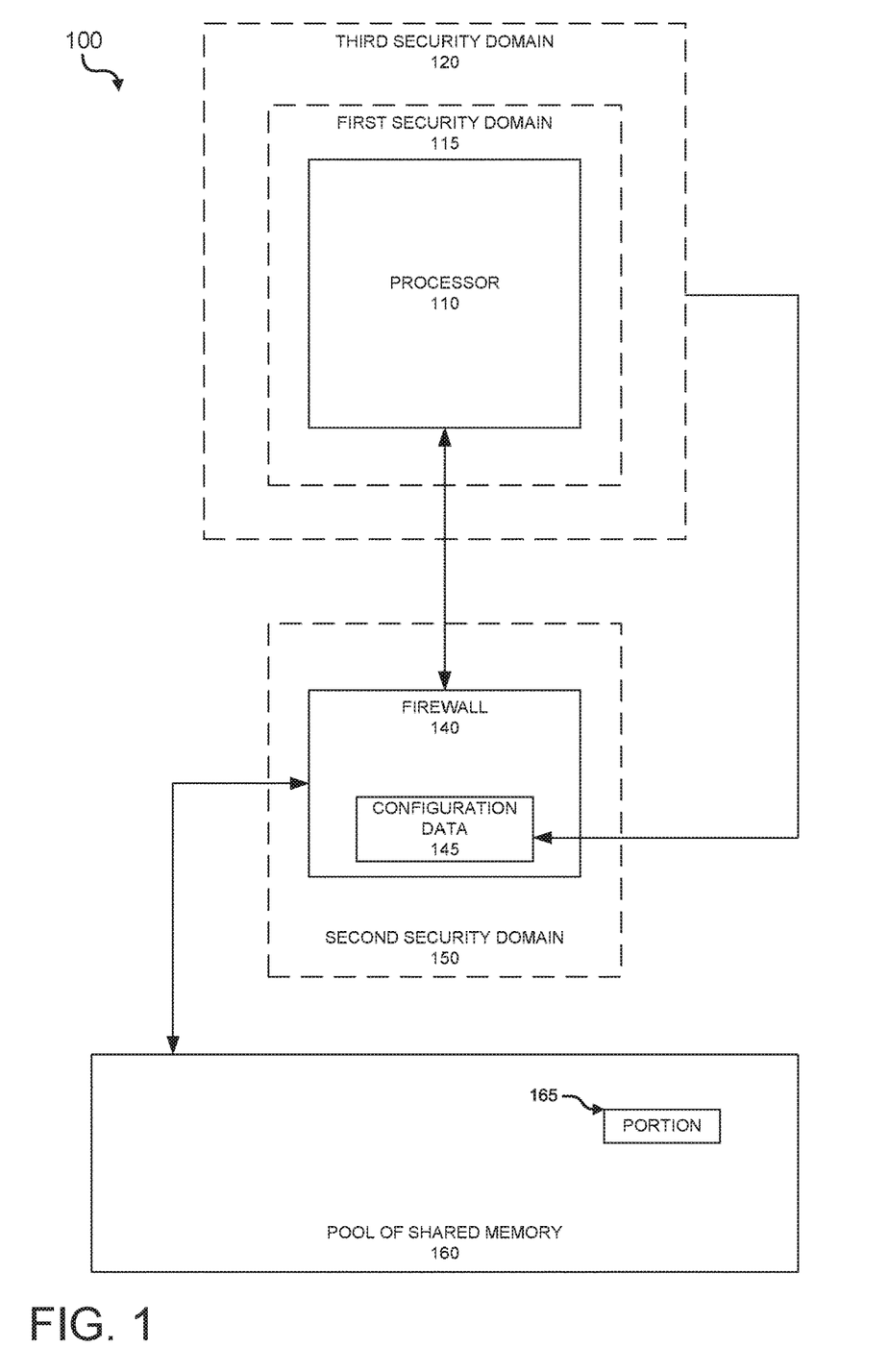
FIG. 1 depicts an example system that may utilize the firewall techniques described herein.
Figure 2A:
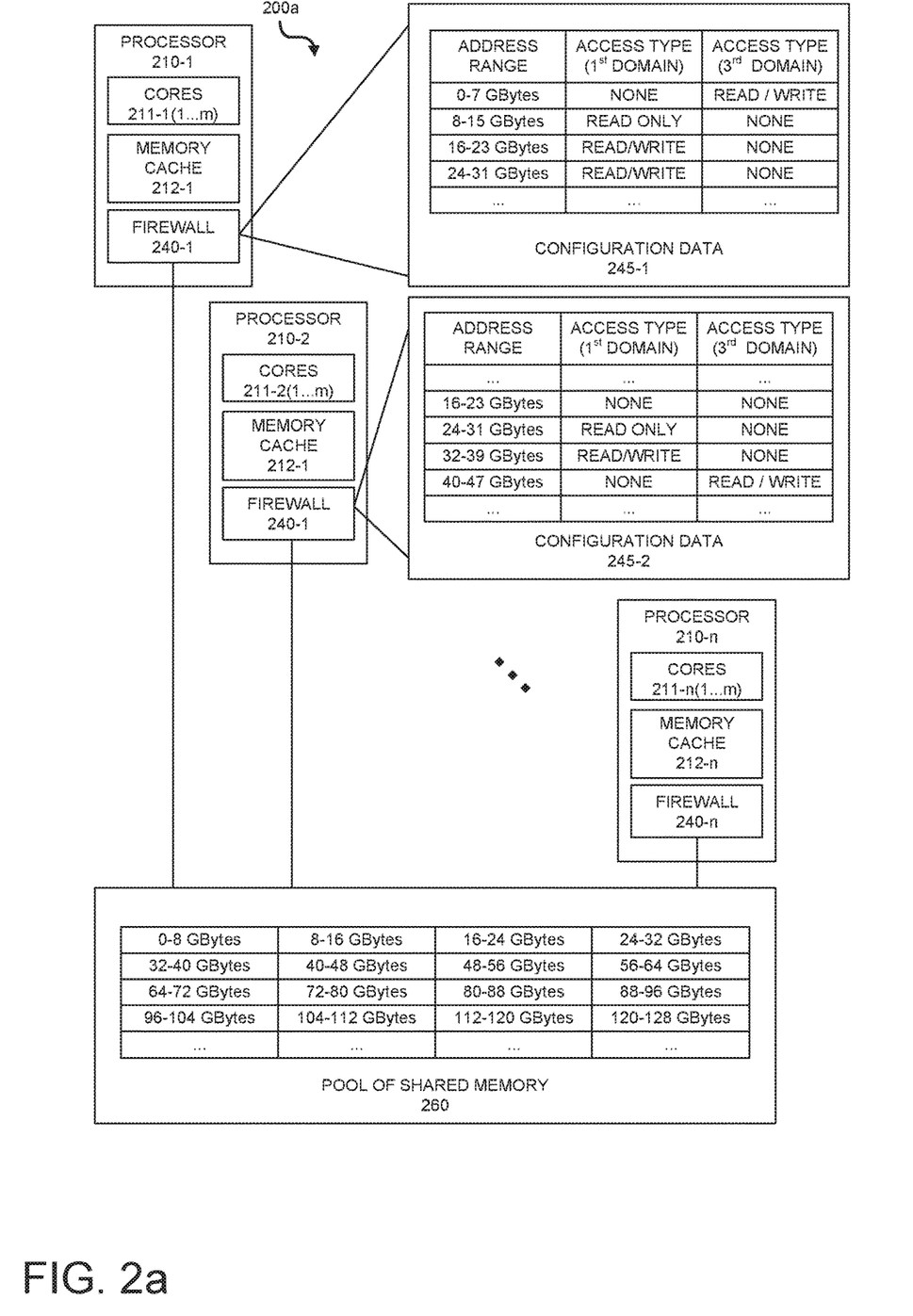
Figure 2B:
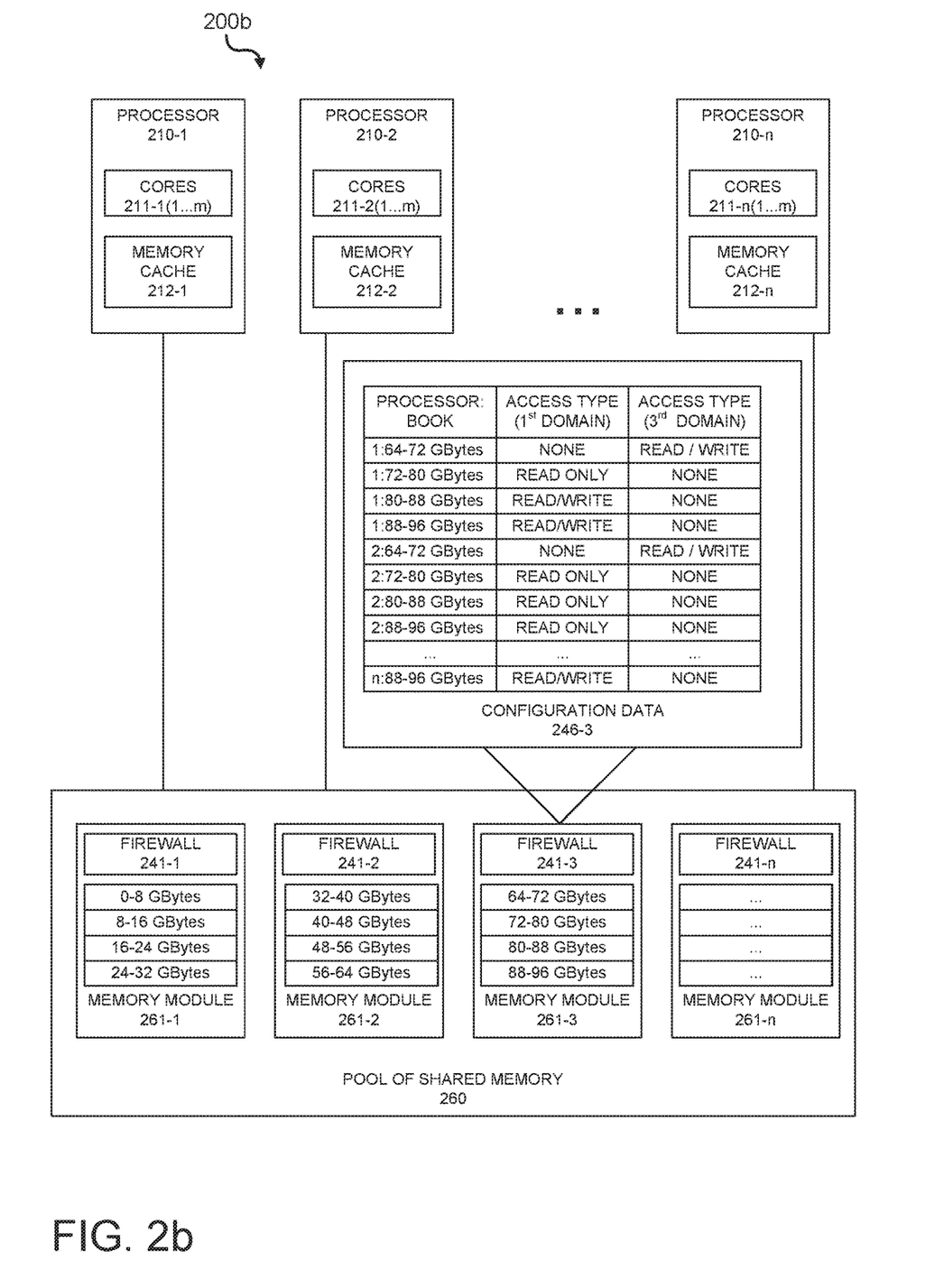

FIG. 1 depicts an example system that may utilize the firewall techniques described herein. System 100 may include a processor 110, a firewall 140, and a pool of shared memory 160. The processor may be communicatively coupled to the pool of shared memory through the firewall. In other words, all access to the pool of shared memory by the processor may go through the firewall. For purposes of this description an access includes reading from the pool of shared memory or writing to the pool of shared memory. Although only a single processor and firewall is depicted in FIG. 1, this is for purposes of ease of description. The techniques described herein are applicable to any number of processors and firewalls. Additional example implementations utilizing multiple processors and firewalls are described in FIGS. 2(a,b).

The techniques described herein are not limited to any particular type of processor 110. For example, the processor may be a central processing unit with a single core or multiple cores. The processor may be a graphics processing unit (GPU), which may have large numbers of cores operating in parallel. The processor may also be integrated into a larger integrated circuit, such as a SOC that provides additional functionally. What should be understood is that as used herein, the processor is an element that requests access to portions of the pool of shared memory 160.

The firewall 140 may be a component within system 100 that receives a request to access the pool of shared memory 160 from the processor 110 and determines if the access is allowed. In some implementations, the firewall may be logic circuitry that receives a request from the processor and determines if the access is allowed. In other implementations, the firewall may be implemented as a circuitry operable to execute instructions, those instructions stored on a non-transitory medium. Although the firewall depicted in FIG. 1 is shown as an element external to the processor, it should be understood that this placement is merely an example. In other implementations, such as those depicted in FIGS. 2(a,b), firewalls may be located anywhere between the processor (more specifically the processor memory cache(s)) and the memory of the pool of shared memory. What should be understood is that all accesses by the processor to the pool of shared memory go through a firewall, regardless of the placement of the firewalls within the system.

An individual firewall may include configuration data 145 used to determine whether a processor is allowed to access a section of the shared memory. For example, the configuration data may include a table that lists address ranges of the pool of shared memory and for each range of addresses, the level of access that an associated processor should have to it. In other implementations, the configuration data may be a table associated with sections of memory indicating which processors should be allowed to access those sections of memory. Examples of such implementations are described in FIGS. 2(a,b). However, it should be understood that the techniques described herein are not limited to any particular layout of configuration data. What should be understood is that the configuration data, regardless of form, may be used by the firewall to determine if processor access to a portion of memory is allowed.

System 100 may also include a pool of shared memory 160. The pool of shared memory may include static random access memory (SRAM); dynamic random access memory (DRAM); non-volatile memory (NVM), such as memristor, phase change memory, or spin torque transfer memory; or any other type of memory. The techniques described herein are not limited to any particular type of memory and may be used with any type of memory that is suitable for use with a processor 110. The pool of shared memory may be accessed by one or more processors. Absent the firewalls 140, each processor may be able to physically access all memory within the pool of shared memory. The firewalls and their configuration data 145 may be used to limit which sections of the shared memory a particular processor may access.

During normal operation, the processor 110, or more particularly, cores of the processor, may operate in a first security domain 115 while the firewall 140 may operate in a second security domain 150. While operating in the first security domain, the processor may have no access to the configuration data 145 of the firewall, which is operating in the second security domain. In other words, while operating in the first security domain, the cores of the processor are unable to modify the firewall configuration data. Thus, even if there were malicious processes executing on the cores of the processor running in the first security domain, those processes would not be able to alter the firewall configuration data such that prohibited access to the pool of shared memory 160 would then be allowed.

However, in some circumstances it may be useful for a process executing on the processor 110 to be able to modify the contents of the firewall configuration data 145. For example, during the period of time when the system is being initialized, the firewall configuration data may be blank. As another example, when the system is being reconfigured, the firewall configuration data may need to be modified. As another example, the tenant using an SOC may change and thus the parts of the shared pool of memory that SOC is entitled to access may change; this will require changing the firewall configuration data. The processor or parts of the processor (e.g., 1 or more cores of a multiple core processor) may temporarily operate in a third security domain 120 instead of the first security domain 115. A process running in the third security domain on the processor may be allowed to access the firewall configuration data. The third security domain may have a higher operating privilege than the first security domain and operation in the third domain may be considered operation in a trusted execution environment. Put another way the second security domain, in which the firewall runs, may allow access to the configuration data by the processor (or parts of the processor) when the processor or those parts are running in the third security domain, but not in the first security domain.

Put yet another way, the processor 110 may operate in two domains, a first domain 115 which might be referred to as a normal world and a third domain 120, which might be referred to as a secure world. The firewall 140, and in particular, the firewall configuration data 145 may only be modified when the processor (or one of its parts) is running in the secure world. Thus, while the processor is operating in the normal world, the firewall configuration data cannot be modified. Altering the firewall configuration data will be described further below. Furthermore, although the first security domain 115 and the third security domain 120 are depicted as static and overlapping, this is not the case. The processor, or more specifically cores of the processor may normally operate in the first security domain, and only switch to the third security domain when changes to the firewall configuration data are needed. In some cases, only a portion of the processor, such as a single core, may temporarily operate in the third security domain, while the remainder operates in the first security domain.

In normal operation, a processor 110 may attempt to access a portion of memory 165 in the pool of shared memory 160. The portion of memory may be a byte of memory, a word of memory (nominally 4 bytes), a cacheline (size dependent on processor architecture; usually 64 bytes on today's processors), or any other unit of memory access that the processor is capable of. The techniques described herein are not dependent upon access of any given size.

The access attempt may be sent from the processor 110 to the firewall 140. The firewall may then determine a section of memory that contains the portion of memory 165 that the processor is attempting to access. The firewall may then determine, based on the firewall configuration data 145, if access to the section of memory is allowed. If the access is allowed, the processes may be allowed to proceed with the access. If the access is not allowed, the request may be denied.

The firewall configuration data 145 need not always be stored in the firewall 140 itself. For example, in some cases, the pool of shared memory 160 may be very large. The amount of firewall configuration data needed to store the tables (or other structures) used in determining whether access is allowed could become quite large. Rather than storing all of the data within the firewall, the firewall may operate similar to a system utilizing virtual memory and a demand paging system. The complete contents of the configuration data may be stored externally to the firewall (perhaps in a slower, less expensive type of storage). When an access request is received, if the firewall does not already contain the data needed to make an access determination, the data can be pulled in from the external storage. The firewall can continue to operate in this manner until the internal storage available for the configuration data is exhausted. At that point, the firewall may replace configuration data using any replacement technique (e.g., round robin, least recently used, etc.)

FIGS. 2(a,b) depict other example implementations of systems that may utilize the firewall techniques described herein. FIG. 2a depicts an example implementation of a system 200a that may implement the techniques described herein. The system may include a plurality of processors 210-1 . . . n. Each of those processors may include a plurality of cores 211-1 . . . n(1 . . . m), memory cache 212-1 . . . n and a firewall 240-1 . . . n. For ease of description, the various elements will be described collectively, such that reference to element, such as processor 210 refers to all processors 210-1 . . . n. The system may also include a pool of shared memory 260.

The processor 210 may be similar to the processor 110 and that complete description will not be repeated here. The processor may include cores 211(1 . . . m). Each core may be an execution unit that executes instructions. A processor may have at least one core, but may also have a plurality of cores. As mentioned above, a single core of the plurality of cores may, at times, operate in the third security domain, while the remainder of the cores operates in the first security domain. The processor may include a memory cache 212. The memory cache may be a single or multiple level cache. It may be composed of multiple components that are distributed. For example, each processor core may have its own level 1 cache and there may also be a shared last level cache. When the processor requests access to a portion of memory stored in the pool of shared memory, the processor may first check the memory cache to determine if the portion of memory is stored therein. If not, the processor may request the memory element to be retrieved from the pool of shared memory. Assuming that the access is allowed, as will be described below, the portion of memory may be retrieved from the pool of shared memory and stored in the processor cache.

In the example implementation shown in FIG. 2a, the firewall 240 may be integrated with the processor 210. As mentioned above, a processor may be included in a SOC that also provides additional functionality. One of those additional functions may be a firewall. The firewall may implement the access control techniques described above with respect to FIG. 1. For example, the firewall may include configuration data 245. The configuration data may be used by the firewall to determine when access requests by that processor are allowed. The firewall configuration data is described in further detail below.

One thing that should be noted is that the firewall 240 is located downstream from any memory cache 212. In other words, if the processor 210, or more specifically, the processor cores 211(1 . . . m) are considered the head of the stream, the memory cache, if present, will be located downstream of the processor, and the firewall will be located downstream of the memory cache. Thus, an access to a portion of memory may originate with the processor (i.e. core), head downstream to the memory cache, and if the request cannot be handled by the cache, the request proceeds further downstream to the firewall to determine if access is allowed. It should be understood that the presence of the portion of memory in the cache indicates that the memory was previously retrieved and such previous retrieval would have gone through the firewall to determine if access is allowed.

Because the firewall 240 is downstream of the processor 210 and any processor caches 212, it should be understood that the firewall operates independently of any address translation mechanism provided by the processor, the operating system running on the processor, or any other process (e.g., a hypervisor) running on the processor. Thus unlike a virtual memory system or virtual machine systems under the control of a hypervisor, in which various forms of address translation or other types of mapping are used in part to determine if access to a portion of memory is allowed, the techniques described herein operate independently of any such address translation or mapping. Moreover, firewall 240 does not use address translation or mapping to accomplish its function when implementing the techniques described herein.

System 200a may also include shared memory 260. The particular form of shared memory is relatively unimportant. The pool of shared memory may be thought of as a continuous range of memory addresses, starting at address zero and increasing to the maximum amount of memory included in the system. Alternatively, it may be made up of multiple continuous ranges of memory addresses; for example, there may be one continuous range of memory addresses per memory a module.

In some implementations, the address range may be segmented into smaller size sections. For example, as shown, the continuous range of address has been divided into 8 GigaByte (GB) sections. For ease of description, these 8 GB sections may be referred to as books. It should be understood that the sections of memory may be larger or smaller, and in some implementations need not all be of the same size.

The firewall configuration data 245 of each firewall may define the permissions for the associated processor 210 to each book of memory. For example, as shown in configuration data 245-1, the address ranges of the first four books is shown. As mentioned above, the processor may operate in two security domains, a first domain (e.g., normal world) and a third domain (e.g., secure world). For each book, the configuration data may indicate what level of access is allowed by the processor to that book, given the domain from which the access was made.

For example, as shown, for the first book (0-8 GB), the processor 210-1 has no access when operating in the normal world, and has read write access when operating in the secure world. The ranges shown are inclusive-exclusive; that is, 8-16 GB denotes addresses from 8 GB to (16 GB-1). For the next book (8-16 GB), the processor has read only access when operating in the first domain, and no access in the third domain. For the next book (16-24 GB), the processor has read/write access in the first domain, and no access otherwise. In some implementations, the configuration data may indicate only a single level of access, which is used for the first security domain. In other implementations, a single value may simultaneously specify access levels for both the first and third domains.

It should be understood that access to the books is not necessarily exclusive to a single processor. For example, as shown in the configuration data 245-1, processor 210-1 has read/write access to the 24-32 GB book, while according to the configuration data 245-2, processor 210-2 has read-only access to that same book (assuming both processors are operating in the first domain). What should be understood is that the techniques described herein provide for the ability to allow or restrict access to the pool of shared memory based on the firewall configuration data, but do not themselves impose any restrictions on different processors having the ability to access the same books of memory.

In operation, a process running on the processor 210 may wish to access a portion of memory (e.g., a cacheline). The processor, in conjunction with the memory cache 212, and any applicable virtual address translation mechanisms, determine if the cacheline needs to be retrieved from the pool of shared memory. If so, the request may be sent to the firewall. The firewall 240 may determine which book contains the cacheline that is being requested and may examine the configuration data 245 to determine the type of access to that book that is allowed, given the current operating mode of the processor (core) when it made the access request. If the configuration data indicates the access request is allowed, the cacheline may be retrieved from the pool of shared memory. If the access is not allowed based on the firewall configuration data, the request may be denied. It should be noted that the firewall itself performs no address translation.

FIG. 2b depicts another example implementation of a system 200b that may implement the techniques described herein. Many of the components in FIG. 2b are similar to those describe in FIG. 2a, and as such, the descriptions are not repeated here. For example, the processors 210, cores 211, and memory caches 212 are in general the same and their description is not repeated here.

In system 200b the firewalls 241 are no longer integrated with the processors. In system 200b, the firewalls may be integrated within the memory modules 261 that provide the physical memory making up the pool of shared memory 260. For example, the pool of shared memory may comprise a plurality of memory modules 261-1 . . . n. Each of the memory modules may provide the physical memory for some number of books of memory. For example, memory module 261-1 may provide storage for books with the address ranges 0-8 GB, 8-16 GB, 16-24 GB, and 24-32 GB. It should be understood that the particular segmentation of the address ranges is unimportant. What should be understood is that a book may be stored on a given memory module, and that memory module has associated with it a firewall. Alternatively, a book may be spread across several memory modules using interleaving.

The firewalls 241 also include configuration data 246. However, unlike in the previous example implementation, the configuration data has a list of processors 210, and what level of access that processor has to each book stored on the memory module 261, given the operating mode of the processor. In other words, a request to access a portion of memory is received at the firewall of the memory module containing the book that includes the portion of memory. The firewall may determine from which processor the request came, to what book it is addressed, and the operating mode of the access request; using this information the firewall may determine if access to the portion of memory should be allowed.

Figure 3:
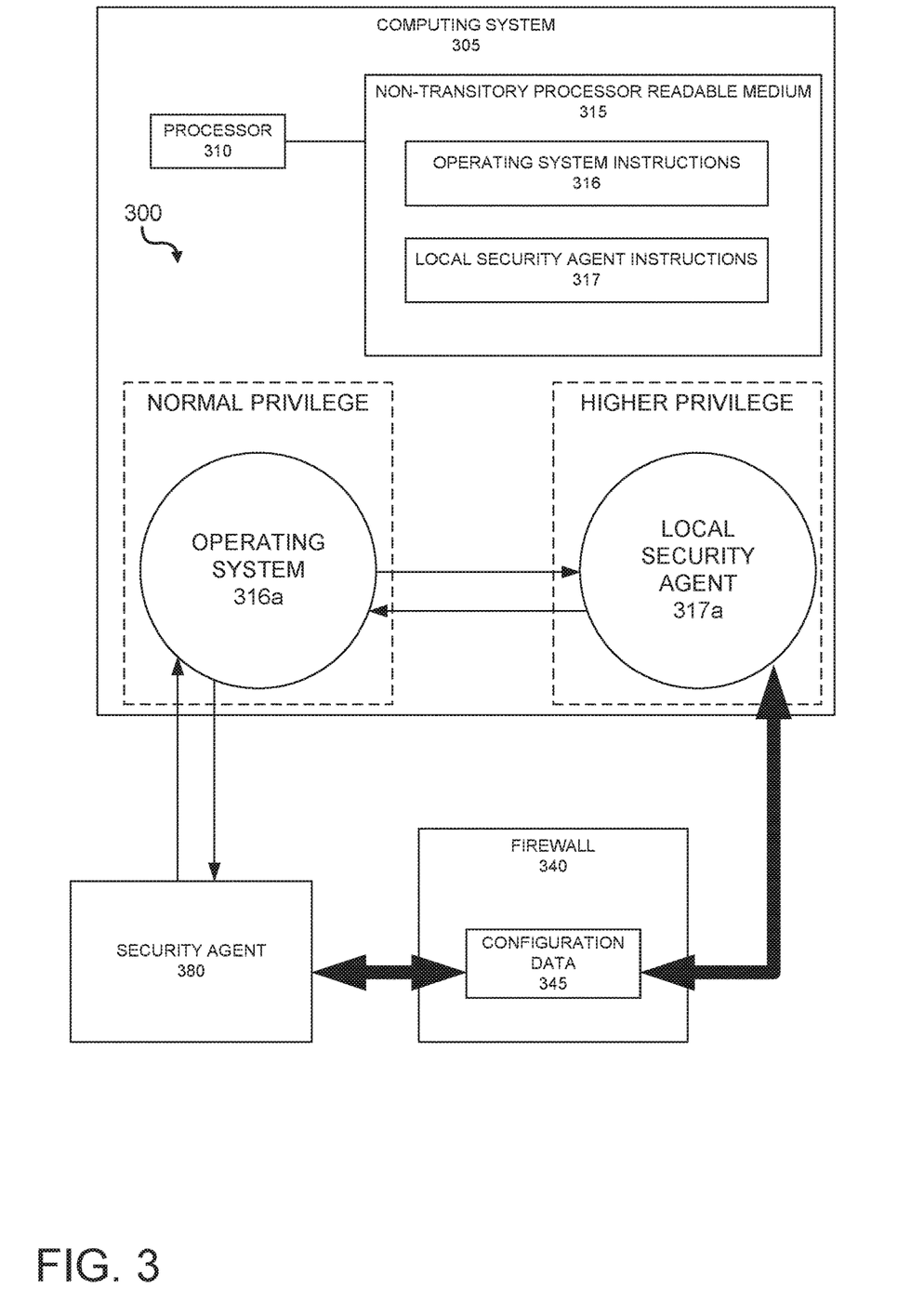
FIG. 3 depicts an example of a system that may be used to set firewall configuration data, according to techniques described herein.

FIG. 3 depicts an example of a system that may be used to set firewall configuration data, according to techniques described herein. In the previous figures, the firewall configuration data was assumed to have already been populated within the firewall. System 300 shown in FIG. 3 depicts a system which may be used to populate or update the firewall configuration data. System 300 may include a computing system 305, a firewall 340, and a security agent 380.

The computing system 305 may be a computer that includes a processor 310 coupled to a non-transitory processor readable medium 315. The medium may include instructions therein, which when executed by the processor cause the processor to implement the techniques described herein. For example, the medium may include operating system instructions 316 and local security agent instructions 317. The medium 315 may actually consist of two or more mediums; for example, the operating system instructions 316 may be on one medium and the local security agent instructions 317 may be on another. The operating system instructions describe an operating system; it and any processes running under it run in the first security domain (e.g., normal world). The local security agent instructions are intended to describe instructions that execute while the processor is operating in the third security domain (e.g., secure world). Operation of the local security agent is described in further detail below.

The firewall 340 may be communicatively coupled to the computing system. As explained above, the firewall can be situated in multiple places, such as being integrated within the processor, a standalone component, or integrated within a memory module. What should be understood is that requests from a processor to access the pool of shared memory go through a firewall, regardless of where the firewalls are situated. Furthermore, it should be understood that although FIG. 3 depicts a single processor and firewall, this is for ease of description only. The techniques described herein are applicable regardless of the number of processors and firewalls.

System 300 may also include a security agent 380. The security agent may operate external to the computing system 305. For example, in one possible architecture, computing system 305 may be implemented as multiple blades within a blade enclosure, while the security agent is implemented as a process running on a standalone server located externally to the blade enclosure. In other implementations, the computing system may include multiple processors, and one of those processors may be selected as a security processor and is allowed to run the security agent. Regardless of how implemented, what should be understood is that the security agent is a trusted component. The security agent is assumed to be non-malicious and firewall configuration data provided by the security agent is deemed to be reliable.

The security agent may establish a secure channel to a firewall for communicating firewall configuration data 345. Through the secure channel, the security agent may populate or update the firewall configuration data. As explained above, the firewall configuration data may be used by the firewall to determine the level of access to portions of the pool of shared memory.

In one example implementation, the firewall configuration data 345 or updates to it may be provided directly from the security agent 380 to the firewall 340 over a direct secure channel. For example, in the case where the firewall is a standalone component, such as an integrated circuit, a secure channel (as depicted by the thick arrow between the security agent and the firewall) may be provided between the system running the security agent and the firewall. Thus, the security agent may be able to configure the firewall directly, eliminating the possibility that the configuration data is altered en-route to the firewall by the processor.

In another example implementation, the security agent 380 may send a request to alter firewall configuration data to the computing system 305. The operating system instructions 316 may be executed by the processor to cause an operating system 316a to run. The operating system may run in the first security domain (e.g., normal privilege, normal world). The request may be received in a secure format. A secure format is one in which any tampering with the request is detectable. For example, the request may be digitally signed. However the techniques described herein are not limited to digital signing. Any technique through which tampering with the request can be detected are suitable.

The receipt of the request may cause the processor to switch into the third security domain (e.g., higher privilege level, secure world). The processor may then execute the local security agent instructions 317 for the local security agent process 317a. The local security agent process may then receive the request to alter the configuration data from the operating system and determine if the request has been altered in any way. If so, the local security agent may cause corrective action to be taken, as will be described further below. As should be clear, a secure channel is then formed between the security agent and the local security agent.

If the request has not been altered, the local security agent 317a may update the firewall configuration data 345 appropriately. As mentioned previously, the processor 310 is prohibited from accessing the configuration data when operating in the first security domain (e.g., normal world) but is allowed to access the configuration data from the third security domain (e.g., secure world—as depicted by the thick arrow between the local security agent and the firewall configuration data). The local security agent may then send a response back to the security agent 380 indicating that the configuration data changes are completed. The response may also be sent in a format such that any tampering with the response is detectable.

The security agent 380 may then receive the response and determine if the response has been altered in any way. If so, the security agent may take corrective actions against the processor. Possible corrective action is described below. In addition, if no response is ever received or no response is received within a reasonable time, the security agent may also take corrective action. Such action may be necessary to prevent a malicious operating system from failing to deliver firewall configuration data change requests to the local security agent 317a (and ultimately the firewall itself).

Figure 4:
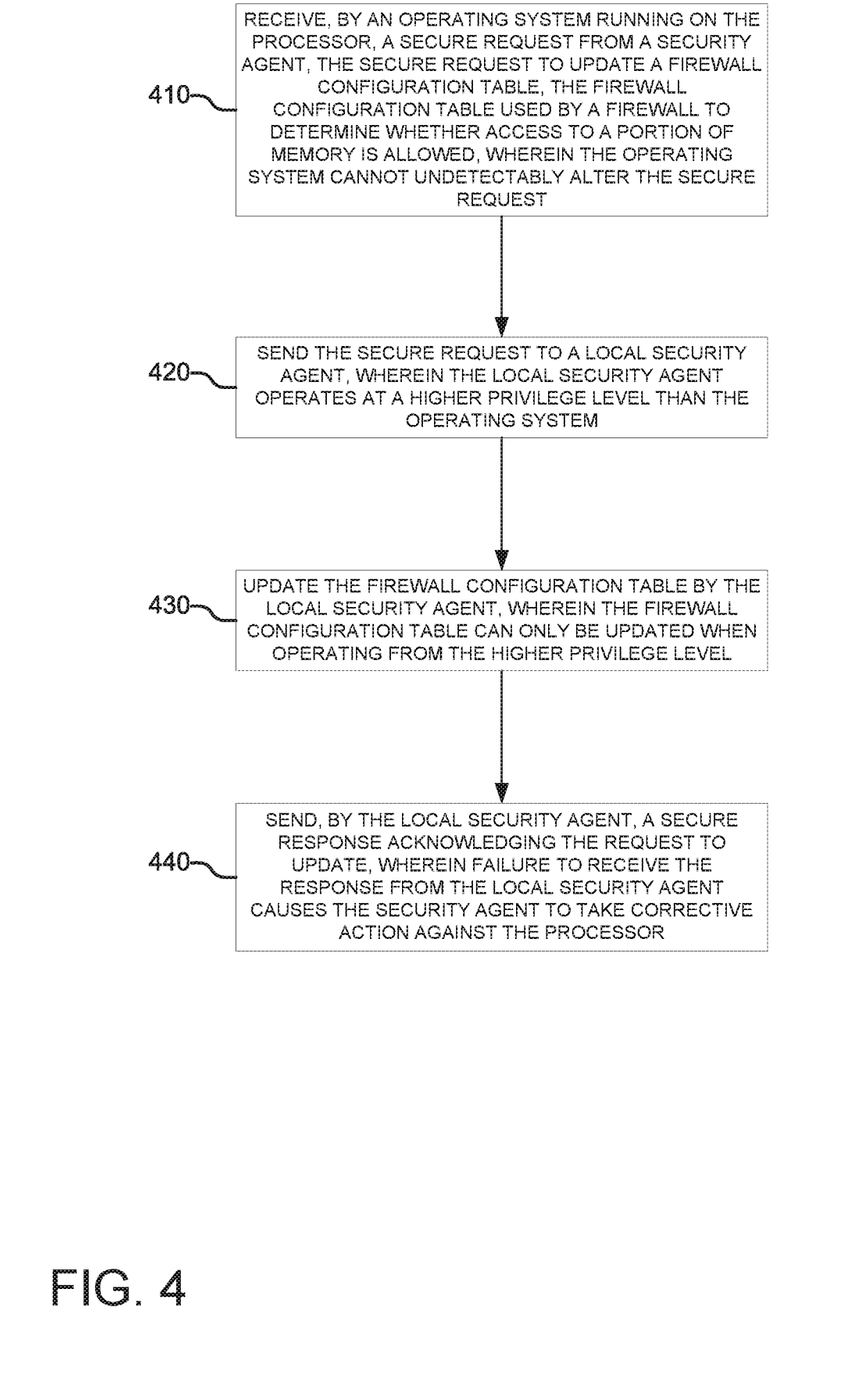
FIG. 4 is an example of a high-level flow diagram for setting firewall configuration data according to techniques described herein.

FIG. 4 is an example of a high-level flow diagram for setting firewall configuration data according to techniques described herein. For example, the flow diagram may be implemented by the local security agent instructions described with respect to FIG. 3. In block 410, a secure request may be received by an operating system running on the processor. The secure request may have come from a security agent. The secure request may be a request to update a firewall configuration table. The firewall configuration table may be used by a firewall to determine whether access to a portion of memory is allowed. The operating system may not be able to undetectably alter the secure request.

In other words, a security agent may send a request to the operating system running on the processor to update the firewall configuration data. The request may be secure meaning that the processor cannot alter the request without the alteration being detectable. Thus, the secure request ensures that the firewall configuration modification desired by the security agent cannot be tampered with or altered prior to being enacted on the firewall. If the request is tampered with, the alteration is detectable, and corrective action may be taken, as described below.

The techniques described herein are not dependent on any particular mechanism for securing the request, so long as alteration is detectable. For example, digital signing techniques based on public-private key encryption may be used to ensure that a request is not altered. In other implementations, the request itself may be encrypted. The particular form is unimportant, so long as it is possible to detect an altered request.

In block 420, the secure request may be sent to a local security agent. The local security agent may operate at a higher privilege level than the operating system. As described above, the higher privilege level may also be described as the third security domain or the secure world. What should be understood is that the local security agent runs in a different, higher privileged security domain than the operating system and is able to receive the request and determine if the request has been altered.

If the local security agent determines that the request has been altered, this may indicate a process or the operating system running on the processor is attempting to alter the firewall configuration data. As should be clear, such modifications are prohibited. The local security agent may cause corrective action to be taken against the processor. For example, the corrective action can include causing the processor to be reset. As another example, the corrective action may be to cause the processor to be isolated from the pool of shared memory. The techniques described herein are not dependent on any particular type of corrective action. What should be understood is that a prohibited attempt to alter firewall configuration data can be detected and prevented.

In block 430, the firewall configuration table may be updated by the local security agent. The firewall configuration table can only be updated by the local security agent when running in the higher privilege level. In other words, the local security agent is able to update the firewall configuration table because the update is only allowed when the processor is running in the higher privilege level. Because the local security agent is operating in the higher privilege level, it is able to modify the firewall configuration table.

In block 440, the local security agent may send a secure response to the security agent acknowledging the request to update the firewall configuration data. A failure to receive the response from the local security agent may cause the security agent to take corrective action against the processor. As above, corrective action may include resetting or otherwise isolating the processor, or any other type of corrective action. The acknowledgement may be used by the security agent to determine that the request was actually delivered to the local security agent by the operating system, and was not simply ignored. Thus, the security agent is ensured that the desired changes to the firewall configuration data were actually delivered to and made by the firewall.

Figure 5:
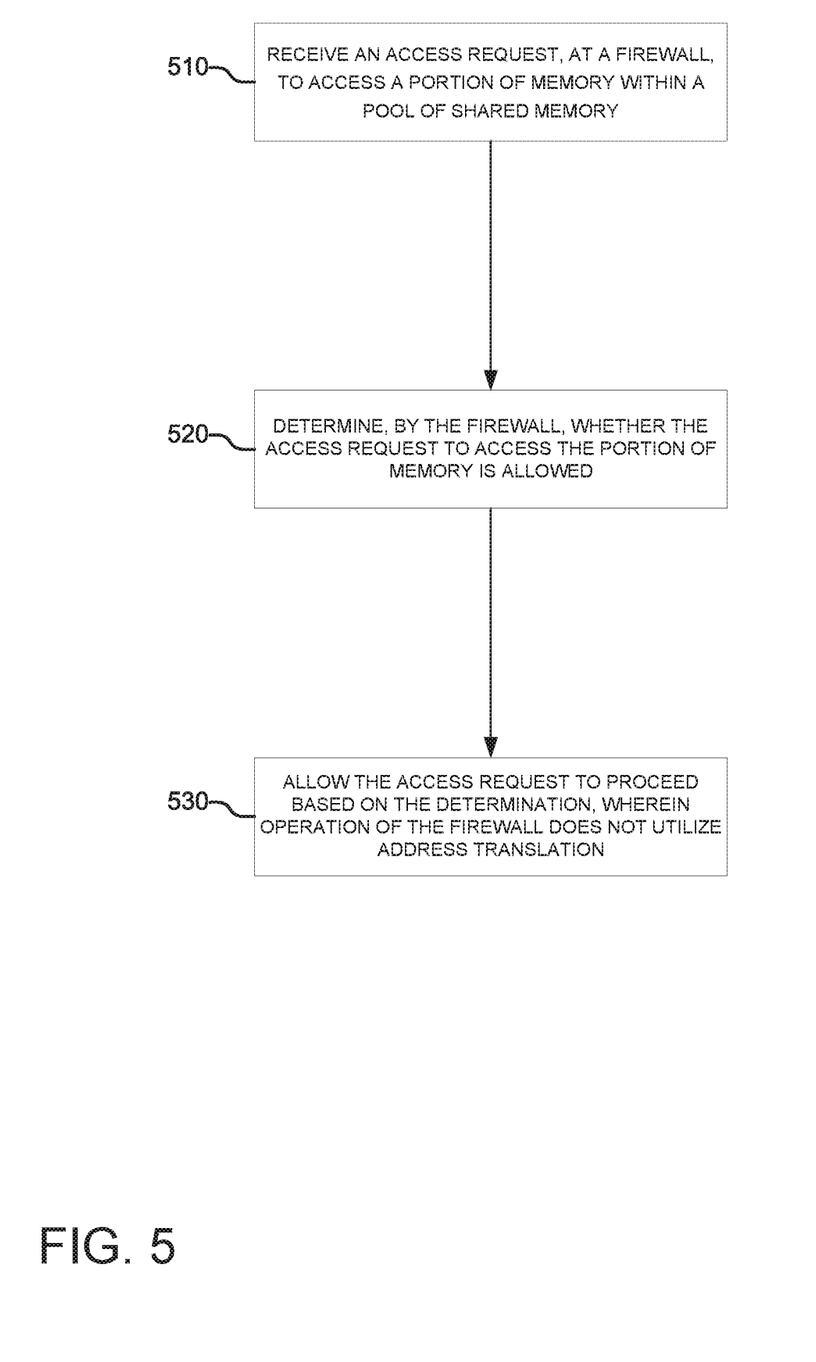
FIG. 5 is an example of a high-level flow diagram for allowing access to memory according to the firewall techniques described herein.

FIG. 5 is an example of a high-level flow diagram for allowing access to memory according to the firewall techniques described herein. In block 510 an access request to access a portion of memory within a pool of shared memory may be received at a firewall. For example, a process running on a processor may wish to access a cacheline that is stored in the pool of shared memory.

In block 520, the firewall may determine whether the access request to access the portion of memory is allowed. As described above, the request may be sent from the processor to the firewall, regardless of where the firewall is located, to determine if the access request should be allowed or not. For example, the firewall may determine if the access request should be allowed based on the configuration data.

In block 530, the access request may be allowed to proceed based on the determination. Operation of the firewall does not utilize address translation. If it is determined that the access request is to be allowed, based on the firewall configuration data, the access request may then proceed. As mentioned above, the operation of the firewall is independent of and does not utilize any address translation mechanisms of the processor or processes (e.g., hypervisors) running on the processors. The portion of memory being accessed may be associated with a book, and the firewall configuration table may be used to determine the level of access of the processor to that book. This level of access may depend in part on the security domain the access was made from.

Figure 6:
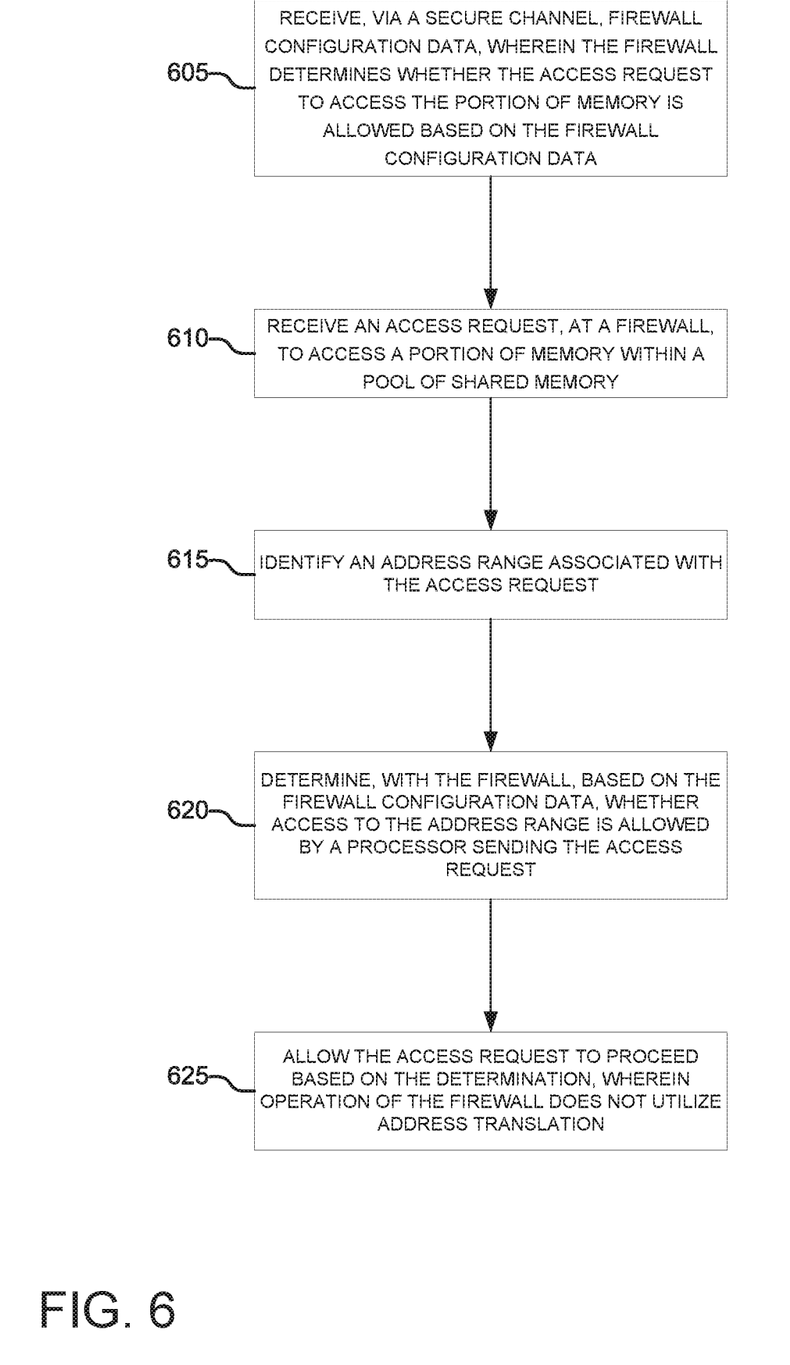
FIG. 6 is another example of a high-level flow diagram for allowing access to memory according to the firewall techniques described herein.

FIG. 6 is another example of a high-level flow diagram for allowing access to memory according to the firewall techniques described herein. In block 605, firewall configuration data may be received via a secure channel. The firewall may determine whether an access request to access a portion of memory is allowed based on the firewall configuration data. In other words, the firewall configuration data is populated or updated through a secure tamper resistant mechanism, such as the one described above.

In block 610, an access request to access a portion of memory within a pool of shared memory may be received at a firewall. As described above, the firewall may be integrated with a processor, stand alone, associated with a memory module, or in any suitable location between an access requester, such as a processor, and the pool of shared memory.

In block 615 an address range associated with the access request may be identified. For example, in one implementation, the portion of memory may be a cacheline, which includes a starting address. That address would be contained within the address range of some book. For example, the starting address might be shifted to the right by 33 bits (2^33=8 GB) to determine a book number.

In block 620, the firewall may determine, based on the firewall configuration data, whether access to the address range is allowed by a processor sending the access request. In other words, the access request is sent from the processor to the firewall. The firewall may determine in which book the portion of memory being accessed resides. The firewall may then determine if the access should be allowed based on the firewall configuration data. The firewall may take into account what security domain the processor (core) was in when it made the request.

As shown in the example implementations, in the case where the firewall is integrated with the processor, the processor sending the request is already known because the firewall is integrated with processor sending the request. In the case of the firewall being integrated with a memory module, the firewall first determines from which processor the request came, then may determine if that processor is allowed to access the book.

Regardless of implementation, the process may move to block 625. In block 625, the access request may be allowed to proceed based on the determination. As explained above, operation of the firewall does not utilize address translation.

We claim:

1. A method comprising:
   implementing a firewall operating in a secure domain between a plurality of processors and a pool of shared memory, such that the firewall is downstream from the plurality of processors;
   determining, by a trusted security agent that an access request is unaltered;
   receiving the access request, at the firewall, to access a portion of memory within the pool of shared memory from one processor of the plurality of processor;
   determining, by the firewall, whether the access request to access the portion of memory is allowed by identifying an address range associated with the one processor from which the access request is received, and determining, with the firewall, based on unmodifiable firewall configuration data when the one processor is operating in a non-secure domain, whether access to the address range is allowed by the processor and whether the processor is operating in a secure or non-secure domain; and
   allowing the access request to proceed based on the determination,
   wherein the firewall operates independently of address translation or mapping performed by the plurality of processors.

2. The method of claim 1 further comprising:
   receiving, via a secure channel from the trusted security agent, firewall configuration data, wherein the firewall determines whether the access request to access the portion of memory is allowed based on the firewall configuration data.

3. The method of claim 2 wherein the secure channel includes a process running on a processor that sends access requests, the process running with elevated execution privileges.

4. The method of claim 1 wherein the firewall is integrated with a memory module associated with the portion of memory.

5. The method of claim 1, wherein the plurality of processors are connected to the pool of shared memory and physically access the pool of shared memory via one of a fabric or interconnect.

6. The method of claim 1, wherein each of the plurality of processors comprise a system on a chip (SOC), and wherein every part of the pool of shared memory is physically accessible by each SOC via one of a memory interconnect or memory fabric.

7. The method of claim 6, wherein each SOC is controlled by a separate operating system (OS) instance.

8. A system comprising:
   a pool of shared memory;
   a processor operating in a first security domain to attempt access to a portion of memory within the pool of shared memory;
   a trusted security agent controlling the firewall determining whether the attempt to access has been altered; and
   a firewall situated downstream from the processor and operating in a second security domain to determine whether the access is allowed independently of address translation or mapping performed by the processor, the determination based on firewall configuration data specifying whether access to an address range commensurate with the portion of memory is allowed, wherein the firewall configuration data cannot be modified by the processor when at least one of the processor is operating in the first security domain and when the trusted security agent determines that the attempt to access has been altered.

9. The system of claim 8 further comprising:
   the processor operating in a third security domain, wherein the firewall configuration data can be modified by the processor when operating in the third security domain.

10. The system of claim 9 wherein the first security domain is a normal execution environment and the third security domain is a trusted execution environment.

11. The system of claim 8 wherein the firewall is situated downstream from memory caches of the processor.

12. The system of claim 8 wherein all access from the processor to the portion of memory goes through the firewall.

13. The system of claim 8 wherein the processor and firewall are integrated within a single device.

14. The system of claim 8, further comprising one of a memory interconnect or a memory fabric across which the processor is physically connect to the pool of shared memory, and through which every part of the pool of shared memory is made physically accessible to the processor.

15. A non-transitory processor readable medium containing thereon a set of instructions which when executed by a processor cause the processor to:
- receive, by an operating system running on the processor, a secure request from a security agent, the secure request to update a firewall configuration table, the firewall configuration table used by a firewall to determine whether access to a portion of memory is allowed, wherein the operating system cannot undetectably alter the secure request to update the firewall configuration table or a request to access the portion of memory;
- send the secure request to a local security agent, wherein the local security agent operates at a higher privilege level than the operating system; and
- update the firewall configuration table by the local security agent, wherein the firewall configuration table can only be updated when operating at the higher privilege level such that subsequent determinations regarding whether access to the portion of memory is allowed is based on the updated firewall configuration table.

16. The medium of claim 15 further comprising instructions to:
- send, by the local security agent, a secure response acknowledging the request to update, wherein failure to receive the response from the local security agent causes the security agent to take corrective action against the processor.

17. The medium of claim 16 wherein the corrective action is a reset of the processor.

* * * * *